3,012,874
GRANULATION OF CALCIUM METAPHOSPHATE

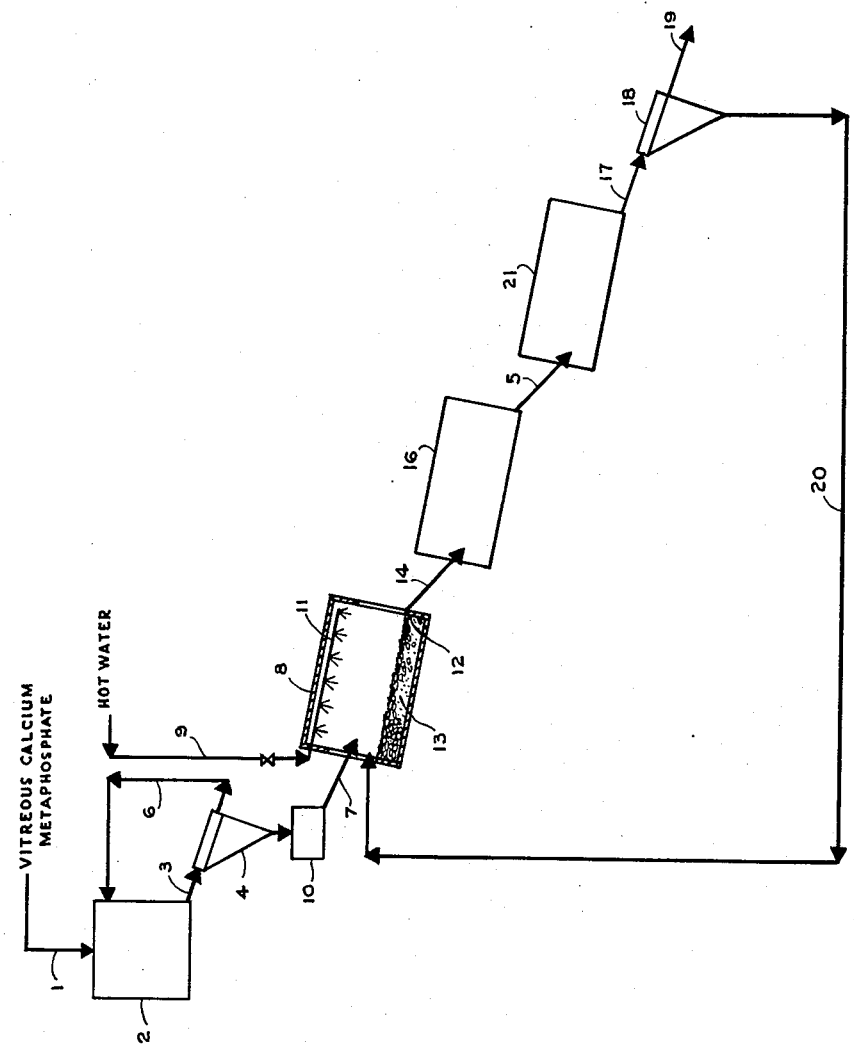

Alvin B. Phillips and Ronald D. Young, Florence, and Earl H. Brown, Sheffield, Ala., assignors to Tennessee Valley Authority, a corporation of the United States
Filed June 3, 1959, Ser. No. 817,954
4 Claims. (Cl. 71—64)
(Granted under Title 35, U.S. Code (1952), sec. 266)

The invention herein described may be manufactured and used by or for the Government for governmental purposes without the payment to us of any royalty therefor.

This invention is an improved process for the manufacture of granular fertilizer from vitreous calcium metaphosphate.

Calcium metaphosphate is well known as a fertilizer material for direct application to soil. It is known to be substantially water insoluble and becomes available for plant food only as it slowly hydrolyzes as a result of the acids and moisture present in the soil. It is customary to grind vitreous calcium metaphosphate so that it will pass a standard 14-mesh screen before use as fertilizer, since it is known that large particles of calcium metaphosphate require so long for hydrolysis that their $P_2O_5$ content does not all become available during a single growing season. Even when ground to pass a 14-mesh screen, hydrolysis of vitreous calcium metaphosphate is slow. Little $P_2O_5$ is available for plant food immediately after application of this material as fertilizer.

The desirability of having some water-soluble phosphate present when calcium metaphosphate is applied to the soil has been recognized and is shown in a copending application of Hignett, Phillips, and Young, Serial No. 579,413, filed April 19, 1956, now U.S. Letters Patent No. 2,945,754. It is also known that granular fertilizer has many advantages over fertilizer of the same composition in finely ground form.

Attempts to granulate calcium metaphosphate have been made, but the ordinary processes of granulation are not effective with this material.

Calcium metaphosphate is a hard, glassy insoluble material which does not become sticky enough to cohere in granules when moistened with water. Granulation with steam has been tried experimentally, but good granulation by this method has not been attained.

It has been proposed to produce granular mixed fertilizer by completely hydrolyzing vitreous calcium metaphosphate with water and strong mineral acid to orthophosphate, and to ammoniate and granulate the orthophosphate product as is shown in U.S. Patent 2,837,418. Processes of this type, however, result in loss of the advantage of additional phosphate becoming available in acid soil as metaphosphate hydrolyzes during an entire growing season.

It is known that hydrolysis of calcium metaphosphate requires boiling in water for prolonged periods or contacting with water and a strong mineral acid at high temperatures in the molten phase. Such types of hydrolysis are not suitable for fertilizer manufacture because of time and cost involved. The above-mentioned application of Hignett, Phillips, and Young describes a process for partial hydrolysis of calcium metaphosphate in the presence of strong acid by controlling the total quantity of water present and cementing residual particles of vitreous calcium metaphosphate and other fertilizer materials together into granules by the incompletely hydrolyzed metaphosphate formed. This process gives good results but cannot be used when maximum concentration of $P_2O_5$ in the granular fertilizer produced is desired.

It is an object of this invention to provide an improved process for the manufacture of granular fertilizer from vitreous calcium metaphosphate.

Another object is to provide a process for the manufacture of granular fertilizer containing 60 percent or more $P_2O_5$ from vitreous calcium metaphosphate.

Another object is to provide such process which is simple and inexpensive to operate and which does not require the addition of any grade-lowering conditioner.

Another object is to provide such process in which well-formed tough granules consisting of fine particles of water-insoluble vitreous calcium metaphosphate are cemented into granules with water-soluble products of hydrolysis which results in granules having high bulk density, excellent handling and storage properties, and containing both immediately available $P_2O_5$ and slowly available $P_2O_5$.

In the present process, vitreous calcium metaphosphate is formed into granules. This is accomplished by feeding finely divided vitreous calcium metaphosphate into a rotating drum at a temperature in the range from about 180° to 225° F., preferably about 200° F. The metaphosphate is moistened with a little hot water, preferably about 200 to 250 pounds of water per ton of product, and the temperature is maintained in the range stated during its passage through the drum by the heat liberated by the hydrolysis of the metaphosphate.

We have found that under these conditions a little viscous material is formed. This viscous material is described in copending applications of Earl H. Brown, Serial Nos. 817,952, now abandonded, 817,953, 817,955, now abandoned, and 817,956, filed herewith June 3, 1959. The viscous material is a sirupy mixture of hydrated polymers of calcium metaphosphate containing about 30 to 60 percent $Ca(PO_3)_2$ polymerized in long chains. A sufficient quantity of this viscous material is formed to cause the solid particles of metaphosphate to be aggregated into granules by the rolling action of the drum, provided the vitreous calcium metaphosphate fed is sufficiently fine. Fineness is critical.

For example, vitreous calcium metaphosphate ground merely to pass a 14-mesh screen as ordinarily used for fertilizer compositions will not granulate, but good granulation is attained easily when this material is sufficiently fine. We prefer to grind the vitreous calcium metaphosphate to such fineness that all will pass a 14-mesh screen and 40 percent will pass a 100-mesh screen. Alternatively, about two-thirds of the material used may be ordinary 14-mesh vitreous calcium metaphosphate, provided this is mixed with about one-third or a little more of metaphosphate ground to pass a 100-mesh screen. The process described above results in a partial hydrolysis of calcium metaphosphate with water. No acid or other promoter of hydrolysis is used.

Preferably, the degree of hydrolysis is controlled so that about 15 percent of the $P_2O_5$ in the granular product is water soluble. Granules thus contain particles of unhydrolyzed vitreous calcium metaphosphate, held together in a matrix of products of partial hydrolysis.

The granules produced have excellent handling and storage properties. They require no conditioner to prevent caking in bags or in storage bins. The presence of a minor proportion of phosphate in water-soluble form furnishes immediately available $P_2O_5$ for plant use, while unhydrolyzed calcium metaphosphate slowly hydrolyzes during the growing season by the action of water and acid in the soil to release additional $P_2O_5$ in a form available for plant food as the growing season progresses.

The product is in the form of well-shaped, tough granules of desired size for best application to soil. It has a high bulk density, usually 70 to 80 pounds per cubic foot.

Our process is simple and inexpensive. Only water is added for granulation. We do not use any acid or other hydrolysis-promotion agent. In plants where vitreous calcium metaphosphate is produced, most or all the heat required in our process might be retained by grinding vitreous metaphosphate while hot and immediately feeding it to a rotating drum for partial hydrolysis and granulation.

The equipment required in this process is of conventional type usually present in commercial fertilizer plants, is simple in design, and easily maintained.

The product has the advantage of high grade, since the $P_2O_5$ content may easily be maintained at above 60 percent, and usually about 61 percent, available $P_2O_5$. It is not necessary to use any grade-lowering material to maintain loose granular condition of the product.

The attached drawing illustrates one particular application of the process of our invention. In the particular process illustrated, vitreous calcium metaphosphate is fed at 1 into any suitable grinding apparatus 2 where it is finely ground. The ground calcium metaphosphate then is transferred by any suitable means of conveyance 3 to a means for sizing, illustrated as a set of screens 4.

Oversize is recycled to grinder 2, as shown at 6. Material fine enough that substantially all will pass a 14-mesh screen and about 40 percent will pass a 100-mesh screen is transferred from the sizing device 4 to a preheater 10. In the preheater this material is heated to the range from about 180° to 225° F., preferably about 200° F. Preferably, about two-thirds of the total feed is ordinary run-of-plant minus-14 mesh material heated to raise its temperature sufficiently to give temperatures in the range from 180° to 225° F. after one-third of the total feed in minus-100 mesh size, at room temperature, is mixed with it. The hot material is then transferred via chute 7 from preheater 10 to rotating drum 8.

Drum 8 preferably is rotated at a peripheral speed of about 100 to 200 feet per minute. Hot water at a temperature of about 190° to 200° F. is introduced into drum 8 via line 9 and sprays 11 located above the bed. Any type spray desired may be used, provided it is of such nature that there is even distribution of water upon the bed of vitreous calcium metaphosphate 13. The depth of bed 13 is regulated preferably at about 12 percent of the diameter of the drum by end rings 12 located in drum 8. The materials in bed 13 are maintained at a temperature in the range from about 180° to 225° F., or preferably about 200° F., during their travel through the drum.

Under these circumstances sufficient viscous hydrated polymers of calcium metaphosphate are formed to bind the materials into granules. Granulation in passing through a single drum is very good. Usually about 80 percent of the material emerging from the drum by overflowing end rings 12 is of minus-6 to plus-20 mesh in size. The material emerging at 14 is passed into a drying drum 16 where it is rolled until dry. The material emerging from drum 16 is transferred via any suitable conveyor 5 to a cooling drum 21. Dry, cooled material from drum 21 is transferred in any suitable manner as shown at 17 to a suitable sizing means 18, which is preferably a set of screens. Product is withdrawn at 19. Fines may be recycled at 20 to drum 8.

Many variations in the process just described may be made without departing from the spirit of our invention. For example, if vitreous calcium metaphosphate is fed hot from a furnace for its production to grinder 2, the preheating drum 10 may be omitted. Calcium metaphosphate of ordinary fertilizer size, i.e., fine enough to pass a 14-mesh screen, may be blended with enough of the same material in size fine enough to pass a 100-mesh screen to get a suitable product for feeding into drum 8. Drying drum 16 may be omitted without making a product too moist for most uses, and many other variations in procedure are feasible.

*Example*

A pilot plant was constructed substantially as shown in the drawing, using three drums as illustrated. Regular plant-size calcium metaphosphate, i.e., vitreous calcium metaphosphate that had been pulverized fine enough that all would pass a 14-mesh screen, was mixed with about one-third its weight of more finely pulverized calcium metaphosphate. All the latter was fine enough to pass a 100-mesh screen. The regular plant-size material also contained some fines, so that the resulting mixture contained about 40 percent of material fine enough to pass a 100-mesh screen. The coarser material was heated in a Roto-Louvre dryer to a temperature of about 350° to 450° F. before mixing with the finer material. The fine material was not heated, as we had found that high dust losses in stack gases occurred when attempts were made to heat the fine material in a heater of this type.

The fine and coarse materials were mixed and fed into a hopper from which they were transferred to a rotating drum about 3 feet in diameter and 3 feet long. The temperature of the complete charge of calcium metaphosphate fed was about 200° F. Hot water at 190° to 200° F. was sprayed on the hot bed of calcium metaphosphate in the granulating drum through two solid-cone nozzles located about 8 inches above the bed. These sprays were positioned 6 inches apart and were located near the midpoint of the drum. The bed's depth was controlled at about 4 inches after the first test by using a low retaining ring. Better rolling action was obtained with a bed of this depth. Four tests were made under the same conditions. A mixture of two-thirds minus-14 mesh and one-third minus-100 mesh calcium metaphosphate was used in each test. This mixture contained approximately 40 percent of material fine enough to pass a 100-mesh screen.

In the first two tests the product from the granulation drum, corresponding to drum 8 in the drawing, was cooled without drying. In the last two tests it was dried at a product temperature of about 150° F. The production rate in each test was about 0.75 ton per hour. Water was sprayed onto the bed of metaphosphate in the granulation drum at a rate of about 210 to 260 pounds per ton of product. Variations in water rate were used as the primary control of granulation, since the temperature could not be varied readily. The best degree of granulation was obtained when the water rate was about 230 to 250 pounds per ton of product.

Granulation efficiency was very good in each test, with 80 percent or more of the product converted into granules in the minus-6 to plus-20 mesh range. The screened product was predominantly plus-16 mesh in size. The granules were well formed.

In the tests in which cooling was employed without drying, screen performance was satisfactory when the screen was brushed occasionally. When the granulator product was dried, screening was very good, and little or no brushing was required. Oversize material from the cooler or dryer could not be crushed in a hammer mill or roll crusher because of the soft interior of the lumps. After aging for several days, the oversize had hardened to the extent that crushing was feasible. Screen analysis indicated that operation of this process can be controlled to produce less than 10 percent of oversize material. In one test, only 2 percent of oversize was formed. Thus, storage of this material for later crushing would not create a major problem.

Chemical analysis of product samples showed that the available $P_2O_5$ content was about 61 percent. The grade was decreased from that of vitreous calcium metaphosphate used by only 2 percentage points as a result of hydrolysis and moisture addition. The water-soluble $P_2O_5$ content of the product granules ranged from 8.5 to 10 percent. The product samples from tests in which only cooling was employed contained from 2.1 to 2.6 percent moisture determined by the A.O.A.C. method. The dried product contained only 0.9 percent moisture and remained completely loose and free-flowing in storage piles, although placed in such piles while at a temperature of 120° F.

We claim as our invention:

1. A process for granulating calcium metaphosphate which consists of introducing vitreous calcium metaphosphate in particles of such size that substantially all will pass a standard 14-mesh screen and about 40 percent will pass a 100-mesh screen and at a temperature in the range from 180° to 225° F. into a rotating drum; moistening the particles of calcium metaphosphate with a liquid consisting of hot water; maintaining a temperature in the range from about 180° to 225° F. in the drum; and withdrawing a granular fertilizer product consisting essentially of granules containing agglomerated vitreous calcium metaphosphate particles held together in a matrix of hydrated polymers of calcium metaphosphate.

2. A process for granulating calcium metaphosphate which consists of introducing vitreous calcium metaphosphate in particles of such size that substantially all will pass a standard 14-mesh screen and about 40 percent will pass a 100-mesh screen and at a temperature in the range from 180° to 225° F. into a rotating drum; moistening the particles of calcium metaphosphate with about 200 to 250 pounds of a liquid consisting of hot water per ton of product; maintaining a temperature in the range from about 180° to 225° F. in the drum; and withdrawing a granular fertilizer product consisting essentially of granules containing agglomerated vitreous calcium metaphosphate particles held together in a matrix of hydrated polymers of calcium metaphosphate.

3. A process for granulating calcium metaphosphate which consists of introducing vitreous calcium metaphosphate in particles of such size that substantially all will pass a standard 14-mesh screen and about 40 percent will pass a 100-mesh screen and at a temperature in the range from 180° to 225° F. into a rotating drum; moistening the particles of calcium metaphosphate with about 200 to 250 pounds of a liquid consisting of water having a temperature in the range from about 190 to 200° F. per ton of product; maintaining a temperature in the range from about 180° to 225° F. in the drum; and withdrawing a granular fertilizer product consisting essentially of granules containing agglomerated vitreous calcium metaphosphate particles held together in a matrix of hydrated polymers of calcium metaphosphate, said granules containing above 60 percent $P_2O_5$.

4. A process for granulating calcium metaphosphate which consists of introducing vitreous calcium metaphosphate in particles of such size that substantially all will pass a standard 14-mesh screen and about 40 percent will pass a 100-mesh screen and at a temperature of about 200° F. into a rotating drum; moistening the particles of calcium metaphosphate with about 200 to 250 pounds of a liquid consisting of water having a temperature in the range from about 190° to 200° F. per ton of product; maintaining a temperature in the range from about 180° to 225° F. in the drum; and withdrawing a granular fertilizer product consisting essentially of granules containing agglomerated vitreous calcium metaphosphate particles held together in a matrix of hydrated polymers of calcium metaphosphate, said granules containing about 61 percent total $P_2O_5$ comprising about 15 percent of total $P_2O_5$ in water-soluble form.

References Cited in the file of this patent

UNITED STATES PATENTS 2,837,418    Seymour _____ June 3, 1958